(No Model.)

F. L. SHEPPARD.
BRAKE SHOE.

No. 355,477.  Patented Jan. 4, 1887.

Attest

Inventor.
Frank L. Sheppard
by his attorney
Francis T. Chambers

United States Patent Office.

FRANK L. SHEPPARD, OF ALTOONA, PENNSYLVANIA.

BRAKE-SHOE.

SPECIFICATION forming part of Letters Patent No. 355,477, dated January 4, 1887.

Application filed November 24, 1886. Serial No. 219,753. (No model.)

*To all whom it may concern:*

Be it known that I, FRANK L. SHEPPARD, of Altoona, Blair county, and State of Pennsylvania, have invented a new and useful Improvement in Brake Shoes or Rubbers for Unflanged Engine Driving-Wheels, of which the following is a true and exact description, due reference being had to the accompanying drawings, which form a part hereof.

My invention relates solely to brake-shoes for the plain or unflanged driving-wheels of locomotives, and has for its object to keep the shoe in a fixed and true position when applied to the smooth tire, to wear away all such metal as may be pressed out at the sides or edges of the tire by the pressure of the rail, and to wear away that portion of the face of the tire which does not come in contact with the rail, and is consequently less worn in ordinary use, reference being now had to the drawings which illustrate my invention, and in which—

Figure 1:
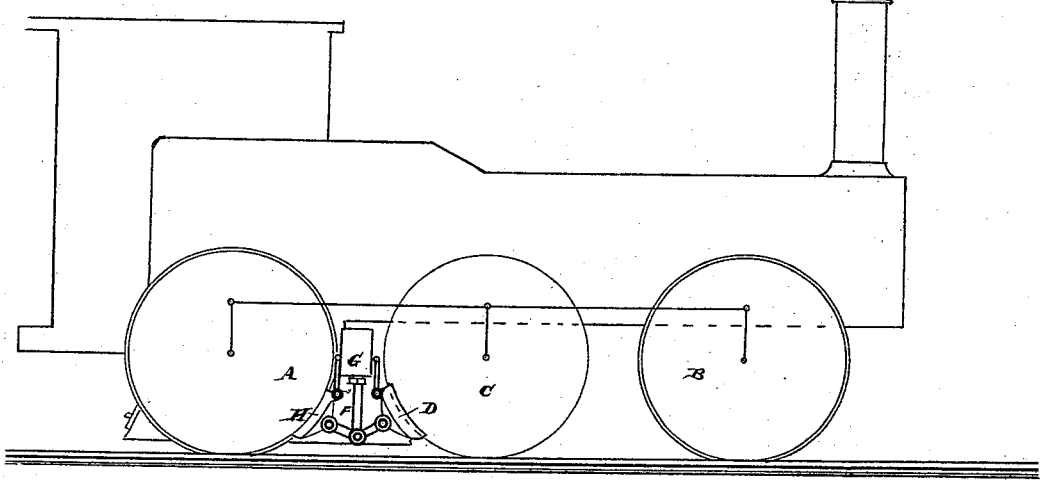
Figure 2:
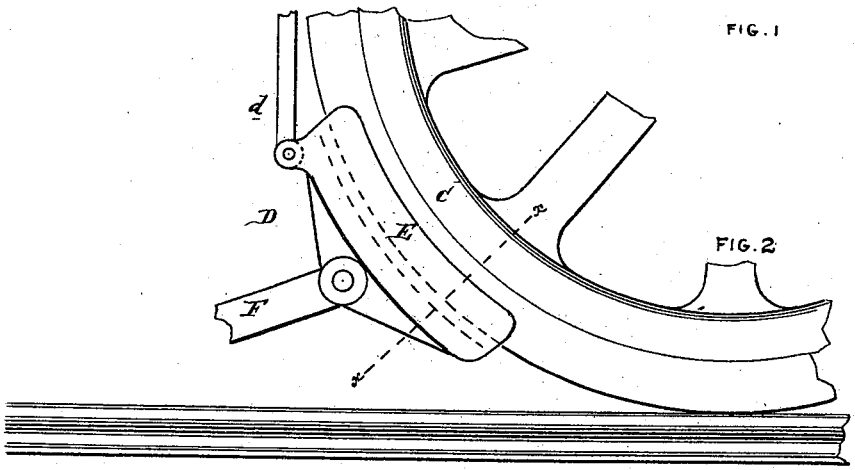
Figure 3:
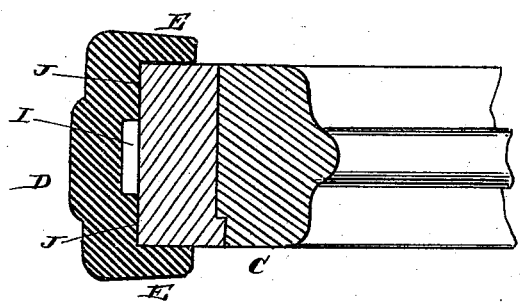

Figure 1 is a side view of a locomotive having a plain or unflanged driving-wheel. Fig. 2 is a side view of a portion of the unflanged driver, showing my improved brake-shoe applied thereto; and Fig. 3 is a cross-section through the tire and shoe, taken on the line *x x* of Fig. 2.

A and B are ordinary flanged driving-wheels. C is a plain or unflanged driver.

D is my improved brake-shoe, which is provided on each side with lips or flanges E E, projecting inward along the sides of the unflanged tire.

J J are the surfaces of the brake-shoe which press against the face of the tire, and I is a recess separating the pressure-surfaces J J, and so placed as to cover that portion of the tire-face which is ordinarily in contact with the rail.

H is an ordinary brake-shoe fitted to the flanged driver A.

G, F, and *d* are the ordinary parts of the air-brake and gear, which, as they form no part of my invention, need not be described.

As will be observed, my improved shoe is securely kept in position by its two flanges, E E, which also, by rubbing against the tire, wear down any projections which may be forced out on the edge or side of the smooth wheel-tire C. The recess I over that part of the tire-face which is most worn by contact with the track prevents any additional wear from coming on such part from the friction of the shoe, all of this wear taking place on the outer extremities of the tire-face upon which the brake-shoe surfaces J J press, and which are consequently worn down at approximately the same rate as the central portion. While, however, I consider the use of this recess to be advisable, I do not intend to limit my claims to brake-shoes having such recesses.

Having now described my invention, what I claim as new, and desire to secure by Letters Patent, is—

1. As a new article of manufacture, a brake-shoe for use in connection with the plain or unflanged driving-wheel of a locomotive, having a plain surface corresponding to the face of the wheel-tire and flanges or lips on both sides projecting inward along the side of the tire, substantially as and for the purpose specified.

2. As a new article of manufacture, a brake-shoe for use in connection with the plain or unflanged driving-wheel of a locomotive, having a plain surface corresponding to the face of the wheel-tire, with its central portion recessed or cut away and flanges or lips on both sides projecting inward along the sides of the tire, substantially as and for the purpose specified.

FRANK L. SHEPPARD.

Witnesses:
W. S. JACKSON,
J. G. MILLER.